May 4, 1954 P. E. REEVES 2,677,719

SUBSCRIBER TELEVISION SYSTEM

Filed May 29, 1948 3 Sheets-Sheet 1

PIERCE. E. REEVES
INVENTOR.

BY Bruce L. Birchard

HIS AGENT

SUBSCRIBER TELEVISION SYSTEM

Filed May 29, 1948 3 Sheets-Sheet 2

PIERCE E. REEVES
*INVENTOR.*

BY [signature]
*HIS AGENT*

May 4, 1954 P. E. REEVES 2,677,719

SUBSCRIBER TELEVISION SYSTEM

Filed May 29, 1948 3 Sheets-Sheet 3

PIERCE E. REEVES
*INVENTOR.*

BY Bruce L. Birchard

*HIS AGENT*

Patented May 4, 1954 2,677,719

UNITED STATES PATENT OFFICE 2,677,719

SUBSCRIBER TELEVISION SYSTEM

Pierce E. Reeves, Park Ridge, Ill., assignor to Zenith Radio Corporation, a corporation of Illinois Application May 29, 1948, Serial No. 30,067

13 Claims. (Cl. 178—5.1)

This invention relates to television signalling systems of the subscriber type, and more particularly to such systems similar to those disclosed in copending application Serial No. 773,848 by Erwin M. Roschke, entitled "Image Transmission Systems," filed on September 13, 1947, which has now issued as Patent 2,547,598, April 3, 1951, and assigned to the present assignee.

The above mentioned copending application discloses an image transmission system wherein a coded television signal is transmitted, which signal may be decoded in subscriber receiver systems upon the receipt of decoding key signals transmitted on a private link connecting the transmitter to the subscriber receivers.

The coding system, claimed in the above application, comprises a system in which the video signals in a transmitted television signal are delayed a certain amount with respect to the synchronizing signals. This delay occurs from time to time, and the times of occurrence of the delay are indicated to the subscriber receivers by means of the key signals so that appropriate corrective circuits may be initiated thereby at these receivers.

It is a primary object of the present invention to provide a novel system for coding a composite television signal.

Another object of this invention is to provide a receiving system, capable of normal operation for reception of conventional uncoded television signals, such as are transmitted by standard television transmitters, and readily adaptable for reception of the above described image inverted coded signals upon receipt of appropriate key signals.

Yet another object of this invention is to provide such a receiving system in which the transition from reception of uncoded conventional signals to the reception of such coded signals is accomplished with no further operation than those usually required to tune from one signal to another.

In accordance with the invention, coding of a composite television signal is accomplished by changing the direction of scanning employed at the transmitter during spaced time intervals. Specifically, the scanning direction is reversed by reversing the connections to one or both of the deflecting elements associated with the image translating device at the transmitter in accordance with a predetermined code schedule. Preferably, a key signal representing the code schedule is transmitted to authorized receivers to actuate a suitable decoder which effects a corresponding variation of the scanning direction in the image-reproducing device to provide intelligible image reproduction.

Figure 1:
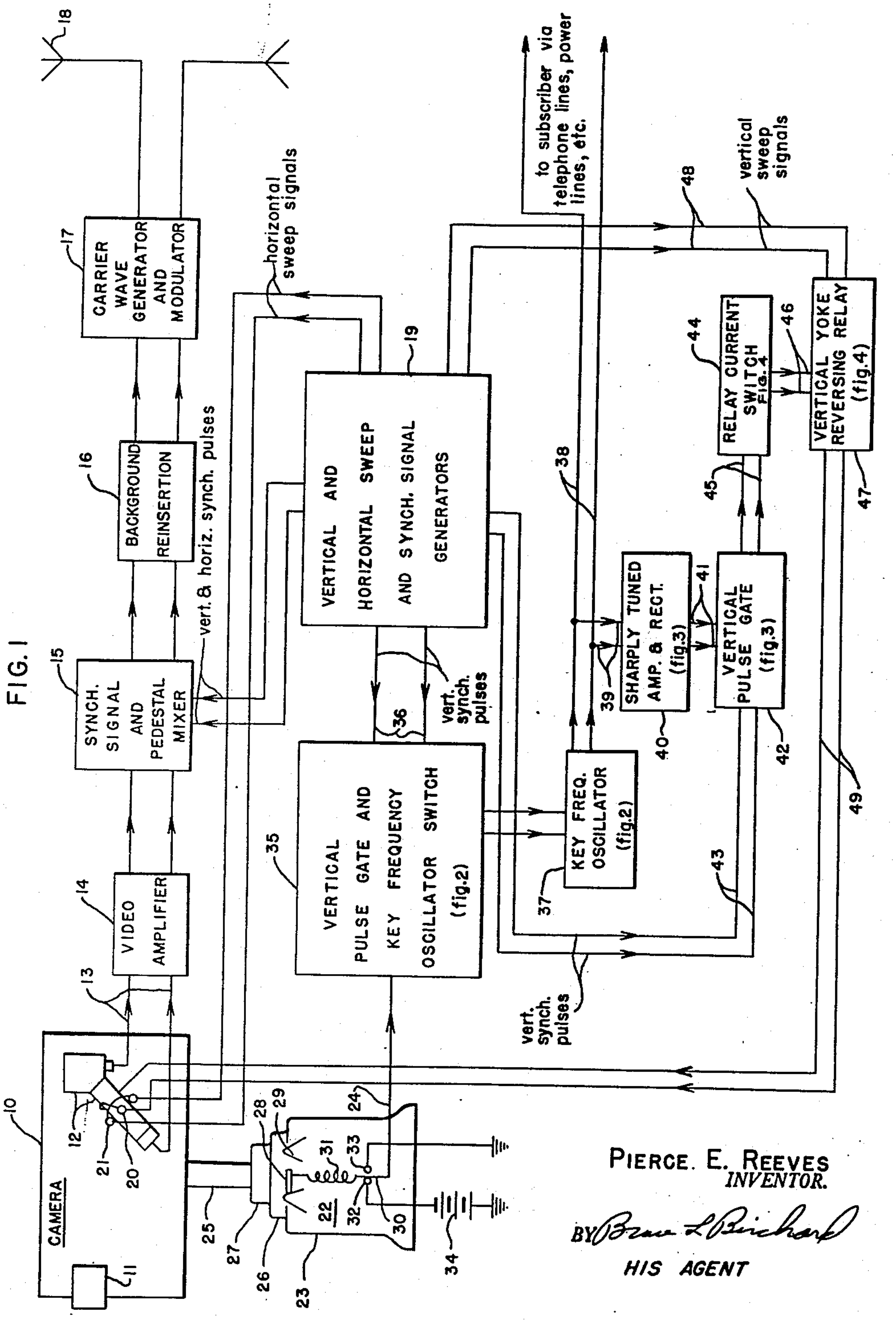
Figure 2:
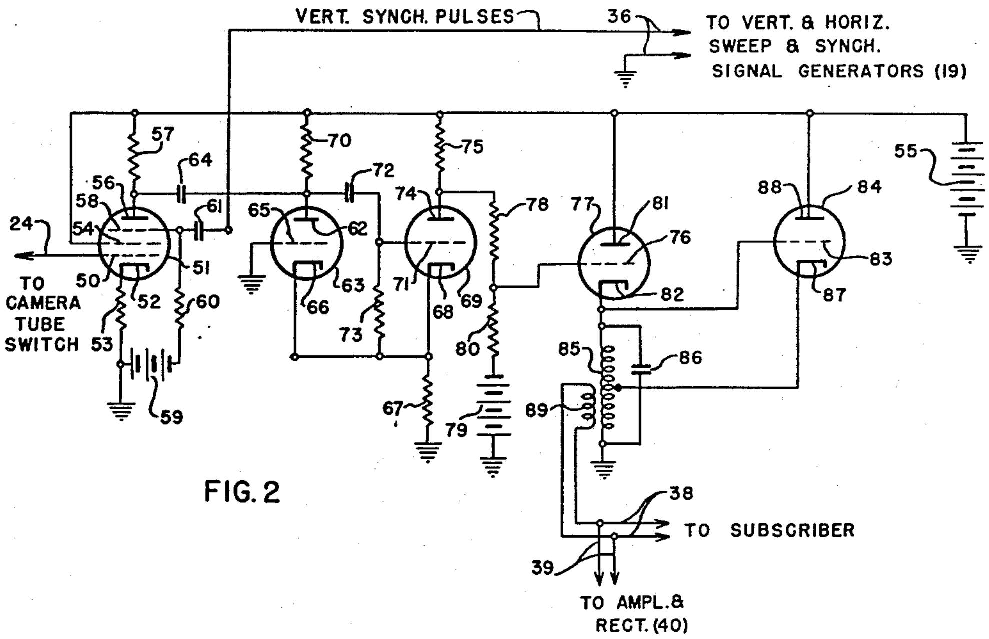
Figure 3:
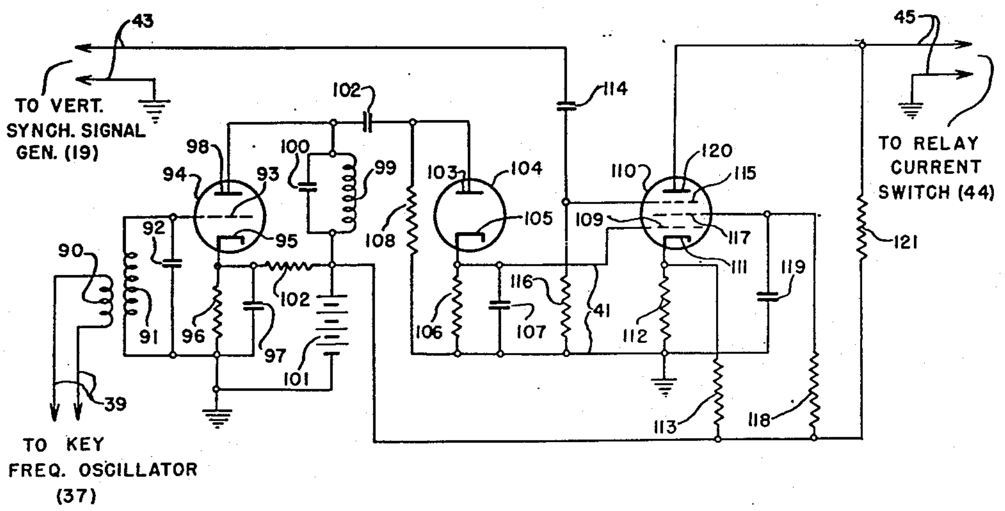
Figures 4, 5:
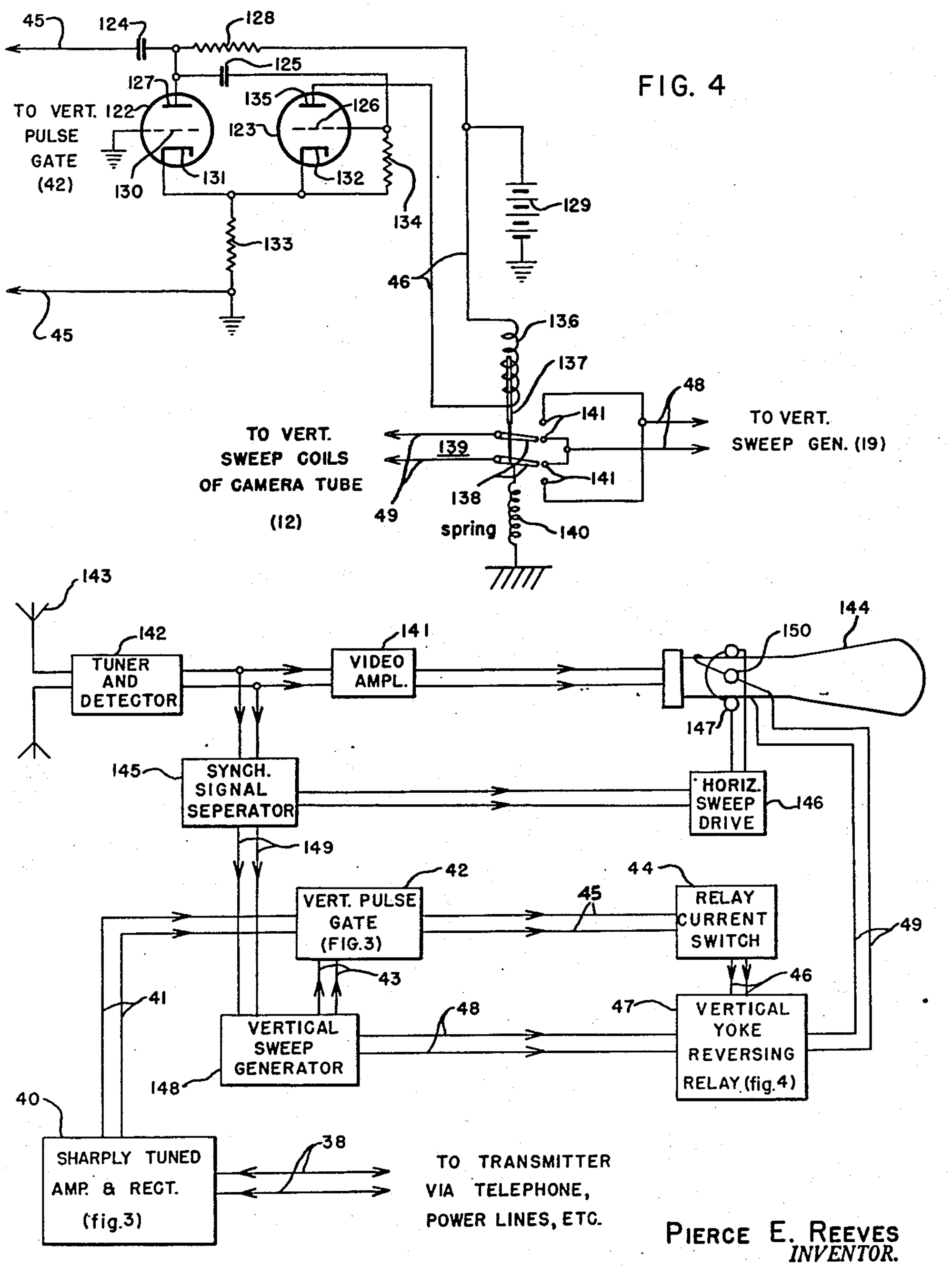

The features of this invention, which are believed to be new, are set forth with particularity in the appended claims. The invention itself, however, together with further objects and advantages thereof may best be understood by reference to the following description when taken in conjunction with the accompanying drawings, in which:

Figure 1 shows a television transmitting system constructed in accordance with the present invention, Figures 2, 3 and 4 show schematically various components of the system of Figure 1, and Figure 5 shows a television receiving system embodying the present invention.

The transmitting system of Figure 1 is one in which the vertical scanning direction is reversed during spaced time intervals. However, it is within the scope of this invention similarly to reverse the horizontal scanning of the subject, or, indeed, to reverse the combined vertical and horizontal scanning thereof.

It is contemplated in the system shown in Figure 1 to cause the alteration between normal picture transmission and transmission with inverted scanning to be accomplished at such times as the television camera is being moved across a scene. However, other well known means, such as random signal generators, oscillators, and the like, may be utilized to cause this alteration.

In Figure 1, a television camera 10 is provided with the usual lens system 11, and iconoscope or image orthicon 12, from which video signals are transferred through conductors 13 to a video amplifier 14. Amplified video signals are then transmitted from video amplifier 14 through a synchronizing signal and pedestal mixer 15, a background reinsertion device 16, and a carrier wave generator and modulator 17 to an antenna 18 from which they are radiated. In other words, the video signals which appear in conductors 13 are treated in an entirely normal fashion, and normal synchronizing signals and pedestals from a vertical and horizontal sweep and synchronizing signal generators 19 are mixed with these video signals in the usual manner in mixer 15, so that the signal radiated from the antenna 18 appears to be quite normal unless it is attempted to reproduce it as a picture. Actually, the video signals which appear in conductors 13 are altered by special alteration of the vertical sweep signals which are impressed on the vertical yoke coils 20 associated with the iconoscope 12. The horizontal sweep signals impressed on the horizontal coil 21, associated with iconoscope 12 are derived unaltered from the sweep signal generators 19. As previously discussed, it is within the scope of this invention to treat the vertical and horizontal sweep signals either separately or together.

In order that proper alterations may be made at the desired time, a snap switch 22 may be provided on the supporting base 23 of camera 10, arranged so that when the camera is being turned in one direction conductor 24 is grounded, and when the camera is turned in the other direction a negative potential is impressed on this conductor. For this purpose, the camera base 23 supports a shaft 25 for rotation therein, the camera 10 being supported on shaft 25. A collar 26 surrounds shaft 25 and rests between the upper surface of the base 23 and a collar 27 integral with shaft 25, the collar 26 being arranged to turn with the camera and shaft 25 until a stop projection 28 on the collar 26 engages one or the other of the two spaced stops 29. The switch 22 includes a moving contact member 30 supported at its lower end on the base 23 and bearing against one end of the spring 31, the other end of spring 31 pressing against stop 28 on collar 26. Suitably fixed contacts 32 and 33 are supported on base 23 on either side of the movable switch member 30. In consequence of the toggle action of the movable switch member 30 and spring 31, member 30 always rests against one or the other of contacts 32 and 33. Contact 33 is grounded and contact 32 is connected to the negative terminal of unidirectional source 34, the positive terminal of which is grounded. In consequence the connection of conductor 24 is altered between ground and the negative terminal of source 34 each time the direction of rotation of the camera tube 10 is changed.

It is preferred that the change from normal transmission to inverted transmission takes place during the transmission of the first vertical or field pulse after the operation of switch 22. For this purpose, conductor 24 is connected with a vertical pulse gate and key frequency oscillator switch 35, to which positive going vertical synchronizing pulses are transmitted through conductors 36 from the vertical and horizontal sweep and synchronizing signal generators 19. The vertical pulse gate 35 is arranged to pass the positive going vertical pulses applied thereto by way of conductors 36 only during such periods when conductor 24 is at negative potential.

The vertical pulse gate and key frequency oscillator switch 35 is connected to a key frequency oscillator 37. When the vertical pulse gate 35 is in a condition to pass pulses, the pulses so passed cause the key frequency oscillator 37 to operate and produce a signal, preferably a sine wave. The key frequency oscillation produced by oscillator 37 is supplied through conductors 38 to a telephone line, power line, or the like, connecting the transmitter to the various subscriber's receiving systems.

The key signal from oscillator 37 is also supplied through conductors 39, connected with conductors 38, to a sharply tuned amplifier and rectifier 40. This amplifier is tuned with sufficient sharpness to prevent the transmission through it of substantially all frequencies except that of the key signal from oscillator 37. The rectifier section of amplifier and rectifier 40 rectifies the key signal passed and amplified by the amplifier section, and the output of the rectifier section is transferred through conductors 41 to a vertical pulse gate 42. Whenever the key signal is produced by oscillator 37 and amplified and rectified by amplifier and rectifier 40, vertical pulses received from the vertical and horizontal sweep and synchronizing generators 19 through conductors 43 are passed by gate 42 to a relay current switch 44 by way of conductors 45. The vertical pulses appearing on conductors 43 are positive going and appear as negative going on conductors 45.

In the absence of pulses on conductors 45, relay current switch 44 causes current to flow in conductors 46 connected to a vertical yoke reversing relay 47. The relay 47 is arranged merely to reverse the connection between its input conductors 48 and the conductors 49 which are arranged to deliver vertical sweep signals to the vertical sweep coil 20 of tube 12.

In consequence, when the vertical yoke reversing relay 47 is de-energized the connections between conductors 48 and 49 are such that the transmitted picture is scanned in an inverted fashion so that a normal receiver would reproduce the picture upside down. Such de-energization occurs only during such periods when the camera 10 is turned to cause conductor 24 to be at negative potential, hence initiating the key frequency oscillator 37 which in turn causes gate 42 to pass pulses on conductor 43. The relay current switch 44 and vertical yoke reversing relay 47 are so arranged that they leave the picture right side up in the absence of pulses on conductors 45.

It is important to note in connection with this arrangement that the complete television signal includes a program signal and a key signal, the program signal being radiated and the key signal being transmitted by wire conductors only. The key signal indicates to subscriber receivers the times of occurrence of such image reversal so that appropriate corrective circuits may be initiated at the receivers and synchronized with such changes.

In the event that phone lines are utilized to transfer the key signal from oscillator 37 to the subscriber's receiver, the frequency of the oscillator should be so adjusted, and suitable filters provided in the telephone system that the key signal from oscillator 37 does not interfere with the normal use of the telephone system. Similarly in power lines, a suitable frequency should be chosen for oscillator 37 and filters provided to separate the key signal from the normal power transmitted by the lines. In all such systems suitable metering means are provided to determine how long each subscriber uses the key signal so that proper charges may be made for such use.

In Figure 2 the vertical pulse gate and key frequency oscillator switch 35 and the key signal oscillator 37 of Figure 1 are shown in detail. The conductor 24 is connected to the first control electrode 50 of an electron discharge device 51 arranged as a gating switch. Cathode 52 is connected to ground through a biasing resistor 53, screen electrode 54 is connected directly to the positive terminal of a source of unidirectional potential 55, the negative terminal of source 55 being grounded, and anode 56 is connected to the positive terminal of source 55 through a resistor 57. The second control electrode 58 of device 51 is connected to the negative terminal of a biasing source 59 through resistor 60, the positive terminal of source 59 being grounded. The control electrode 58 is further coupled to ungrounded conductor 36 through coupling capacitor 61.

When conductor 24 is at a negative potential, discharge current through device 51 is cut off and anode 56 remains at a relatively high positive potential, regardless of the potential of control electrode 58. However, when conductor 24 is grounded, changes in potential of control electrode 58 cause device 51 to conduct current during the presence of positive going vertical synchronizing pulses on conductors 36. When device 51 conducts current, anode 56 recurrently produces negative pulses of potential. Anode 56 is coupled to anode 62 of a discharge device 63 through a coupling capacitor 64. The control electrode 65 of device 63 is connected directly to ground, and the cathode 66 thereof is connected to cathode 68 of discharge device 69, cathodes 66 and 68 being connected to ground through a common resistor 67. Positive unidirectional potential is supplied to anode 62 of device 63 through resistor 70, and this anode is further coupled to control electrode 71 of device 69 through coupling capacitor 72, grid leak resistor 73 being connected between control electrode 71 and cathode 68. The anode 74 of device 69 is connected to the positive terminal of source 55 through resistor 75, and this anode is further connected to control electrode 76 of device 77 through resistor 78, devices 63 and 69 being connected to form a well-known multivibrator circuit and discharge device 77 being arranged to operate as a switch. Control electrode 76 is connected to the negative terminal of a biasing source 79 through a resistor 80, the positive terminal of this source being grounded. The anode 81 of device 77 is connected directly to the positive terminal of source 55, and cathode 82 of this device is connected directly to control electrode 83 of oscillating discharge device 84. Cathode 82 and control electrode 83 are coupled to ground through inductance 85, having a capacitor 86 connected in parallel therewith to form a circuit tuned to the desired key signal frequency. A tap on inductance 85 is connected to cathode 87 of device 84, the anode 88 of this device being connected directly to the positive terminal of source 55. An inductance 89 is coupled to inductance 85 and oscillation produced by the oscillator is thereby impressed on conductors 38 and 39 in the manner previously described.

As pointed out, when device 51 is conducting so that anode 56 and control electrode 71 are at minimum potential and conductor 24 then becomes negative, anode 56 rises in potential causing control electrode 71 similarly to rise so that device 69 becomes and remains conducting. When control electrode 71 starts in the positive direction, device 69 becomes conductive and cuts off the current flow between anode 62 and cathode 66 of device 63 due to the resulting potential drop across common cathode resistor 67. So long as device 69 remains conductive, during the period when conductor 24 is negative, anode 74 remains at a relatively low potential and the potential of source 79 is sufficient so that control electrode 76 of device 77 maintains device 77 in a non-conductive condition. During such times the oscillating discharge device 84 produces a continuous key frequency oscillation which is transmitted over conductors 38 and 39.

During other intervals while conductor 24 is at ground potential, negative potential pulses appear on anode 56 which are transmitted to control electrode 71 and which tend to make device 69 non-conductive and to maintain current flow between cathode 66 and anode 62 of device 63. Coupling capacitor 72 with its associated circuit elements is given a time constant such that device 63 remains conductive and device 69 remains cut off for all intervals except extremely small time intervals preceding each vertical pulse. Therefore, for all such intervals when device 69 is cut off, device 77 conducts current, anode 74 of device 69 being maintained substantially at the potential of source 55, and oscillating discharge device 84 remaining substantially inoperative except for such very small intervals immediately preceding each vertical pulse. These last mentioned intervals are so small that the tuned circuit 85—86 has no time to build up any appreciable oscillation. Consequently during the intervals that conductor 24 is grounded, no appreciable key signal is transmitted over conductors 38 and 39.

In the arrangement of Figure 2, therefore, whenever the potential on conductor 24 rises to ground potential, at the time of the next succeeding positive going vertical synchronizing pulse on conductors 36, the key frequency oscillator including tuned circuit 85—86 ceases operation. Thereafter, following the appearance of a negative potential on conductor 24 and at the time of the next succeeding positive going vertical synchronizing pulse on conductors 36, the tone frequency oscillator again oscillates and continues transmitting the key frequency signal on conductors 38 and 39 until the potential on conductor 24 again rises to ground potential.

Figure 3 illustrates schematically the sharply tuned amplifier and rectifier 40 and the vertical pulse gate 42 of Figure 1. The gate 42 in the presence of the key signal on conductors 39, which as shown in Figure 1 are connected to conductors 38, transfers positive going vertical synchronizing pulses from conductors 43 to conductors 45, and prevents such transfer when the key signal is not present on conductors 39. For that purpose an inductance 90 is connected across conductors 39, this inductance being magnetically coupled to inductance 91. Inductance 91 is shunted by a capacitor 92 to form a resonant circuit tuned to the frequency of the key signal. One terminal of tuned circuit 91—92 is connected to the control electrode 93 of discharge device 94, and the other terminal thereof is grounded. Cathode 95 of device 94 is connected to ground through cathode biasing resistor 96 which is shunted by capacitor 97. The anode 98 of device 94 is connected to one terminal of a tuned circuit comprising an inductance 99 shunted by a capacitor 100, the other terminal of this tuned circuit being connected to the positive terminal of a unidirectional source 101, the negative terminal of this source being connected to ground. The tuned circuit 99—100 is similarly tuned to the frequency of the key signal, and both tuned circuits 91—92 and 99—100 are preferably of high quality so that several cycles of the key signal are required to build up substantial alternating potentials in this circuit. In order to prevent device 94 from responding to very small potentials appearing across conductors 39, the resistor 102 is connected between the cathode 95 of device 94 and the positive terminal of source 101 to maintain a fixed minimum bias between cathode 95 and control electrode 93, so that device 94 will not amplify these small potentials. With such an arrangement, extraneous noise potentials appearing across conductors 39 or short bursts of weak intensity signals across conductors 39 from the tuned frequency oscillator 37 of Figure 1 are not reproduced in the tuned circuit 99—100 to cause false operation of the pulse gate 42 of Figure 1.

The amplified oscillation appearing on anode 98 of device 94 is transferred through capacitor 102 to the anode 103 of rectifier discharge device 104, whose cathode 105 is connected through resistor 106 to ground. A capacitor 107 is connected in parallel with resistor 106, and a resistor 108 is connected between anode 103 and ground so that device 104 rectifies the tone oscillation appearing on anode 98 of device 94, and in response thereto develops across resistor 106 a continuous potential which is positive with respect to ground.

The ungrounded terminal of resistor 106 is connected directly to control electrode 109 of gating discharge device 110, the cathode 111 of device 110 is connected to ground through biasing resistor 112. The cathode 111 is also connected to the positive terminal of source 101 through a resistor 113, so as to maintain this cathode at a fixed positive bias with respect to control electrode 109.

One of the conductors 43 is grounded and the other is coupled through a capacitor 114 to control electrode 115 of device 110, this control electrode being connected to ground through a grid leak resistor 116. The screen electrode 117 of device 110 is connected to the positive terminal of source 101 through a resistor 118 and this electrode is coupled to ground through capacitor 119, hence, the screen electrode 117 is maintained at fixed positive potential with respect to cathode 111. The anode 120 of device 110 is connected directly to one of the conductors 45 to the relay current switch 44 of Figure 1, and the anode receives its operating potential from source 101 through resistor 121, the second conductor 45 being grounded, as shown.

When a continuous positive potential appears across resistor 106 in the presence of the key signal on conductors 39, so as to make control electrode 109 of device 110 positive, the device 110 is so adjusted that positive going vertical synchronizing pulses appearing on conductors 43 are passed to the anode 120 of device 110 and hence appear on conductors 45 as negative going pulses. However, in the absence of the key signal on conductors 39, and hence the absence of positive potential across resistor 106 control electrode 109 of device 110 has such a value that the device is cut off, and pulses on conductors 43 are not passed to the conductors 45. Hence, negative going pulses appear on conductors 45 only in the presence of the tone frequency oscillation on conductors 39.

Figure 4 shows the relay current switch 44 and the vertical yoke reversing relay 47 of Figure 1. Conductors 45 impress negative going vertical pulses on relay current switch 44 in the presence of the key signal from the key signal oscillator 37 of Figure 1. Relay current switch 44 includes two electron discharge devices 122 and 123 connected to form a multivibrator circuit. One of conductors 45 is grounded, and the other is connected through coupling capacitors 124 and 125 to control electrode 126 of device 123. Anode 127 of device 122 is connected through load resistor 128 to the positive terminal of unidirectional potential source 129, the negative terminal of this source being grounded. Control electrode 130 of device 122 is grounded and the cathode 131 of this device is connected directly to cathode 132 of device 123, these cathodes being connected to ground through common resistor 133. Control electrode 126 of device 123 is connected to the cathodes 132 and 131 through grid leak resistor 134. The anode 135 of device 123 is connected to one of the two conductors 46, the other conductor being connected to the positive terminal of source 129, and the operating coil 136 of the reversing relay 47 of Figure 1 being connected across these conductors.

In the absence of vertical pulses between conductors 45, the multivibrator is in a first operating condition in which device 123 remains conductive and device 122 nonconductive, so that maximum current flows through conductors 46 and coil 136 from source 129. Upon the appearance of a negative going vertical pulse between conductors 45, and on control electrode 126 of device 123, current conduction through device 123 begins to decrease with the result that cathode 132 drops in potential and device 122 starts to conduct. Anode 127, therefore, drops in potential and since anode 127 is coupled to control electrode 126 through capacitor 125, the potential of control electrode 126 is reduced still further. This process is continued until device 123 no longer conducts current and device 122 is fully conductive and the multivibrator is in a second operating condition.

The time constant of capacitor 125 and its associated circuits is made slightly less than the vertical synchronizing period, and hence the control electrode 126 is maintained sufficiently negative with respect to cathode 132 for rendering that device 123 nonconductive for a duration equivalent to the period, or slightly less than the period, of the vertical pulses. Hence, during the appearance of negative going vertical pulses on conductors 45, the multivibrator circuit is triggered to its second operating condition and the current through conductors 46 and the coil 136 is substantially zero, and after the disappearance of these pulses and at the time when the next succeeding pulse would appear, capacitor 125 discharges, device 123 is restored to its highly conductive state and the multivibrator circuit returns to its first operating condition, and hence conductors 46 and coil 136 carry maximum current.

The vertical yoke reversing relay 47 of Figure 1 is connected between conductors 48 and 49, and this reversing relay includes the control coil 136 connected across conductors 46, as previously described. The coil 136 has an armature 137 which is arranged to move movable contacts 138 of a double-pole double throw switch 139. The spring 140 is provided to resist the attraction of armature 137 by coil 136, so that when coil 136 is not carrying current, the movable contacts 138 are in their lowermost position, and when the coil 136 carries current the contacts 138 are moved to their uppermost position. Conductors 49 are connected to the movable contacts 138, and the conductors 48, connected to the vertical sweep generators 19 shown in Figure 1, are connected, as shown, to the fixed contacts 141 of the switch, so that operation of the switch reverses the connection between conductors 48—49, and therefore reverses the polarity of the vertical sweep current passing through the vertical sweep coils 20 of Figure 1, consequently turning the picture upside down or right side up as the case may be. Hence it can be seen that in the absence of the key signal from oscillator 37 of Figure 1, current in coil 136 is a maximum and the movable contacts 138 of switch 139 are moved to their uppermost position. It is preferred that the connections of conductors 48 and 49 be made such that normal vertical scanning occurs when switch 139 is in its uppermost position, so that normal operation of the system is obtained in the absence of the key frequency oscillation. Hence, in the presence of the key signal, current in coil 136 drops to a minimum and switch 139 releases to its lowermost position and reversal of the direction of the vertical scanning takes place.

It is to be clearly understood that although a particular reversing relay has been shown and described, the invention contemplates the use of any suitable reversing means either mechanical, electronic, electrical or the like.

In Figure 5 a receiver is illustrated suitable for receiving and reproducing the signal transmitted by the transmitter to Figure 1. In this receiver many of the components are utilized as shown in Figure 1 and described in detail in Figures 2–4. A tuner and detector 142 is connected to antenna 143 to receive, tune and detect radiated signals, and the output thereof is amplified in video amplifier 141 and impressed on the receiver image tube 144 in the usual manner. The output of the tuner and detector 142 is also impressed on the synchronizing signal separator 145 which is constructed in the conventional manner, the horizontal synchronizing signals from separator 145 being impressed on a horizontal sweep generator 146, which drives the horizontal sweep coil 147 of image tube 144. Vertical synchronizing pulses from the synchronizing signal separator 145 are applied to a vertical sweep generator 148 by way of conductors 149.

It is preferred that in the absence of the key signal on conductors 38, which are connected by way of telephone lines and the like to the transmitter described in conjunction with Figures 1–4, the vertical sweep signals from generator 148 are impressed on the vertical sweep coil 150 of the receiver image tube 144, through conductors 48, vertical reversing yoke 47 and conductors 49 in a non-inverted manner. It can be seen, therefore, that the proposed receiver operates in the proper manner to receive conventional television signals that have not been treated in accordance with the present invention. When the key signal is received on conductors 38, this signal is amplified and rectified in the sharply tuned amplifier and rectifier 40, previously described in conjunction with Figure 3. Output from the amplifier and rectifier 40 is impressed on the vertical pulse gate 42, this gate having similarly been previously described in connection with Figure 3. The output from the amplifier and rectifier 40 causes gate 42 to pass vertical blanking pulses from the vertical sweep generator 148 to the relay current switch 44 by way of conductors 43 and 45. Relay current switch 44, previously described in conjunction with Figure 4, in response to the vertical blanking pulses received on conductors 45, causes the vertical yoke reversing relay 47 to reverse the connections of conductors 48—49, hence reversing the vertical sweep of image tube 144 whenever the vertical sweep of the camera tube 12 of Figure 1 is correspondingly reversed. Image tube 144 therefore reproduces the received signal in the proper manner at all times, as the reversals of the vertical scanning of the transmitted image are compensated in the receiver circuit.

Suitable filters are provided in conductors 38 so that the key signal does not interfere with the normal operation of these conductors for telephone communication, power transmission, or the like.

This invention, therefore, provides an image transmission system wherein the scanning of the transmitted picture is reversed at various time intervals. The invention further provides means for causing a key signal to be applied to the receiving system to effect compensation for such reversals.

As previously pointed out, the preferred receiver utilized in the proposed system operates as a conventional receiver in the absence of the key signal on conductors 38, and is capable of receiving conventional television signals. However when signals are transmitted by a system such as that of Figure 1, which would cause a conventional television receiver to reproduce the image alternately upside down and right side up, the proposed receiver automatically compensates for such reversals.

While a preferred embodiment has been shown and described, various modifications of the invention may be made without departing from the true spirit and scope thereof, and it is contemplated in the appended claims to cover any such modifications.

I claim:

1. A subscription type of television transmitter comprising: a picture-converting device; a scanning system associated with said device for effecting scanning of a subject in a certain direction in recurring scanning cycles to develop video-frequency signals representing said subject; coding apparatus coupled to said scanning system having one operating condition in which said scanning is effected in said certain direction, and having another operating condition in which said scanning is effected in a different direction; means coupled to said apparatus for shifting said apparatus from one to the other of said operating conditions during spaced time intervals to code said video-frequency signals; and means for transmitting said coded video-frequency signals to a point remote from said transmitter.

2. A subscription type of television transmitter comprising: a picture-converting device; a scanning system associated with said device for effecting scanning of a subject in a certain direction in recurring scanning cycles to develop video-frequency signals representing said subject; coding apparatus coupled to said scanning system having one operating condition in which said scanning is effected in said certain direction, and having another operating condition in which said scanning is effected in a different direction; means responsive to an applied signal for shifting said apparatus from one to the other of said operating conditions to code said video-frequency signals; a key-signal generator coupled to said last-named means for applying a key signal thereto during spaced intervals; and means for transmitting said coded video-frequency signals to a point remote from said transmitter 3. A subscription type of television transmitter comprising: a picture-converting device; a scanning system associated with said device for effecting scanning of a subject in a certain direction in recurring scanning cycles to develop video-frequency signals representing said subject; coding apparatus coupled to said scanning system having one operating condition in which said scanning is effected in said certain direction, and having another operating condition in which said scanning is effected in a different direction; means responsive to an applied signal for shifting said apparatus from one to the other of said operating conditions to code said video-frequency signals; means for transmitting said coded video-frequency signals to a point remote from said transmitter; and a generator coupled to said first-named means and to a line-circuit extending to said remote point for developing a key signal to actuate said first-named means during spaced time intervals and for transmission to said remote point.

4. A subscription type of television transmitter comprising: a picture-converting device; a scanning system associated with said device for effecting scanning of a subject in a certain direction in recurring scanning cycles to develop video-frequency signals representing said subject; a reversing relay included in said scanning system and responsive to an applied signal for reversing the direction of scanning of said subject in said scanning cycles; apparatus for supplying an actuating signal to said reversing relay in response to an applied key signal; a key-signal generator coupled to said apparatus for applying a key signal thereto; a network coupling said key-signal generator to said scanning system for controlling the operation of said key-signal generator and enabling said generator to generate said key signal solely during spaced intervals to effect coding of said video-frequency signals; and means for transmitting said coded video-frequency signals to a point remote from said transmitter.

5. A subscription type of television transmitter comprising: a picture-converting device: a scanning system associated with said device for effecting scanning of a subject in a certain direction in recurring scanning cycles to develop video-frequency signals representing said subject and including a synchronizing-signal generator for developing a synchronizing signal indicating said scanning cycles; a reversing relay included in said scanning system and responsive to an applied signal for reversing the direction of scanning of said subject in said scanning cycles to code said video-frequency signals; a mixer device coupled to said picture-converting device and to said scanning system for producing a television signal which includes in alternation said video-frequency signals and said synchronizing signal; means for transmitting said television signal to a point remote from said transmitter; key-signal generator controlled by said scanning system for developing a key signal during spaced time intervals for transmission to said remote point over a line circuit; and apparatus coupled to said synchronizing-signal generator and to said key-signal generator responsive jointly to said synchronizing signal and said key signal for supplying an actuating signal to said reversing relay during said spaced time intervals.

6. A subscription type of television transmitter comprising: a picture converting device; a scanning system associated with said device for effecting scanning of a subject in a certain direction in recurring scanning cycles to develop video-frequency signals representing said subject and including a synchronizing-signal generator for developing a synchronizing signal indicating said scanning cycles; a reversing relay included in said scanning system responsive to an applied signal for reversing the direction of scanning of said subject in said scanning cycles to code said video-frequency signals; a mixer device coupled to said picture-converting device and to said scanning system for producing a television signal which includes in alternation said video-frequency signals and said synchronizing signal; means for transmitting said television signal to a point remote from said transmitter; a key-signal oscillator coupled to and controlled by said synchronizing-signal generator for developing a key signal for transmission to said remote point over a line circuit; a gate circuit disposed between said synchronizing-signal generator and said key-signal oscillator; means for opening said gate circuit for random time intervals enabling said key-signal oscillator to develop said key signal solely during such intervals; and apparatus coupled to said synchronizing-signal generator and to said key-signal generator responsive jointly to said synchronizing signal and said key signal for supplying an actuating signal to said reversing relay during said random time intervals.

7. A subscription type of television receiver for utilizing a coded television signal including video-signal components representing a subject scanned in a certain direction in recurring scanning cycles and in a different direction in said scanning cycles during spaced time intervals, said receiver comprising: an image-reproducing device and an associated scanning system; means for supplying said television signal to said reproducing device and its scanning system; decoding apparatus included in said scanning system having one operating condition in which cyclic scanning of said reproducing device is effected in said certain direction, and having another operating condition in which said scanning is effected in said different direction; and means for shifting said decoding apparatus from one to the other of said operating conditions during said spaced intervals to cause said device to reproduce an image of said scanned subject.

8. A subscription type of television receiver for utilizing a coded television signal including video-signal components representing a subject scanned in a certain direction in recurring scanning cycles and in a different direction in said scanning cycles during spaced time intervals, said receiver comprising: an image-reproducing device and an associated scanning system; means for supplying said television signal to said reproducing device and its scanning system; decoding apparatus included in said scanning system having one operating condition in which cyclic scanning of said reproducing device is effected in said certain direction, and having another operating condition in which said scanning is effected in said different direction; an actuating network responsive to an applied signal for shifting said decoding apparatus from one to the other of said operating conditions; and means for supplying a key signal to said actuating network to actuate said network during said spaced time intervals, thereby causing said reproducing device to reproduce an image of said scanned subject.

9. A subscription type of television receiver for jointly utilizing a coded television signal received over a first signal channel and a key signal received over a line-circuit, said television signal including video-signal components representing a subject scanned in a certain direction in recurring scanning cycles and in a reverse direction in said scanning cycles during spaced time intervals, and said key signal indicating said spaced intervals, said receiver comprising: an image-reproducing device and an associated scanning system; means for supplying said television signal to said reproducing device and its scanning system; decoding apparatus included in said scanning system having one operating condition in which cyclic scanning of said reproducing device is effected in said certain direction, and having another operating condition in which said scanning is effected in said reverse direction; an actuating network responsive to an applied signal for shifting said decoding apparatus from one to the other of said operating conditions; and means coupled to said line-circuit for supplying said key signal to said actuating network to actuate said network during said spaced intervals, thereby causing said reproducing device to reproduce an image of said scanned subject.

10. A subscription type of television receiver for jointly utilizing a coded television signal received over a first signal channel and a key signal received over a line circuit, said television signal including video-signal components representing a subject scanned in a certain direction in recurring scanning cycles and in a reverse direction in said scanning cycles during spaced time intervals, and said key signal indicating said spaced intervals, said receiver comprising: an image-reproducing device and an associated scanning system; means for supplying said television signal to said reproducing device and its scanning system; a reversing relay included in said scanning system for reversing the direction of scanning of said reproducing device; a network responsive to an applied signal for actuating said relay; a gate circuit coupled to said network for supplying an actuating signal thereto; and means coupled to said line circuit and responsive to said key signal for actuating said gate circuit during said spaced intervals, thereby causing said reproducing device to reproduce an image of said scanned subject.

11. A subscription type of television receiver for jointly utilizing a coded television signal received over a first signal channel and a key signal received over a line-circuit, said television signal including video-signal components and synchronizing-signal components, said video-signal components representing a subject scanned in a certain direction in recurring scanning cycles and in a reverse direction in said scanning cycles during spaced time intervals, and said key signal indicating said spaced intervals, said receiver comprising: an image-reproducing device and an associated scanning system; means for supplying said television signal to said reproducing device and its scanning system; a reversing relay included in said scanning system for reversing the direction of scanning of said reproducing device; a relay current switch responsive to said synchronizing-signal components for actuating said relay; a gate circuit for applying said synchronizing-signal components to said relay current switch; and a circuit coupled to said line-circuit responsive to said key signal to actuate said gate circuit during said spaced intervals.

12. A subscription type of television system comprising a transmitter and a receiver; said transmitter including, a picture-converting device, a scanning system associated with said device for effecting scanning of a subject in a certain direction in recurring scanning cycles to develop video-frequency signals representing said subject, coding apparatus coupled to said scanning system having one operating condition in which said scanning is effected in said certain direction, and having another operating condition in which said scanning is effected in a different direction; means coupled to said apparatus for shifting said apparatus from one of said operating conditions to the other during spaced time intervals to code said video-frequency signals and means for transmitting said coded video-frequency signals to said receiver; said receiver including, an image-reproducing device and an associated scanning system, means for supplying said video-frequency signals to said reproducing device, decoding apparatus included in said scanning system having one operating condition in which cyclic scanning of said reproducing device is effected in said certain direction, and having another operating condition in which said scanning is effected in said different direction; and means for shifting said decoding apparatus from one to the other of said operating conditions during said spaced intervals to cause said device to reproduce an image of said scanned subject.

13. A subscription type of television system comprising a transmitter and a receiver; said transmitter including, a picture-converting device, a scanning system associated with said device for effecting scanning of a subject in a certain direction in recurring scanning cycles to develop video-frequency signals representing said subject, a reversing relay included in said scanning system and responsive to an applied signal for reversing the direction of scanning of said subject in said scanning cycles to code said video-frequency signal, apparatus for supplying an actuating signal to said reversing relay in response to an applied key signal, means for transmitting said coded video-frequency signals to said receiver, and a generator coupled to said apparatus and to a line-circuit extending to said receiver for applying a key signal to said apparatus and to said line circuit during spaced time intervals; said receiver including, an image-reproducing device and an associated scanning system, means for supplying said video-frequency signals to said reproducing device, a reversing relay included in said scanning system responsive to an applied signal for reversing the directions of scanning of said reproducing device, and means coupled to said line-circuit responsive to said key signal for supplying an actuating signal to said last-mentioned reversing relay during said spaced intervals, thereby causing said reproducing device to reproduce an image of said scanned subject.

References Cited in the file of this patent

UNITED STATES PATENTS

| Number | Name | Date |
|---|---|---|
| 1,910,540 | Hammond | May 23, 1933 |
| 1,978,584 | McCreary | Oct. 30, 1934 |
| 2,164,176 | Goldsmith | June 27, 1939 |
| 2,226,508 | Clothier | Dec. 24, 1940 |
| 2,232,084 | Tolson | Feb. 18, 1941 |
| 2,251,525 | Rosenthal | Aug. 5, 1941 |
| 2,303,830 | Dome | Dec. 1, 1942 |
| 2,402,067 | Mathes | June 11, 1946 |
| 2,403,059 | Dillenback | July 2, 1946 |
| 2,414,101 | Hogan et al. | Jan. 14, 1947 |
| 2,438,946 | Richardson | Apr. 6, 1948 |
| 2,472,774 | Mayle | June 7, 1949 |
| 2,531,974 | Ellett | Nov. 28, 1950 |
| 2,547,598 | Roschke | Apr. 3, 1951 |

FOREIGN PATENTS

| Number | Country | Date |
|---|---|---|
| 315,362 | Great Britain | Feb. 27, 1933 |